US009648634B2

(12) United States Patent
Fanous et al.

(10) Patent No.: US 9,648,634 B2
(45) Date of Patent: *May 9, 2017

(54) SYSTEM AND METHODS FOR PROVIDING A TRANSMISSION SKIPPING POLICY TO IMPROVE PERFORMANCE IN A MULTI-SUBSCRIBER IDENTITY MODULE (SIM) WIRELESS COMMUNICATION DEVICE

(71) Applicant: QUALCOMM Incorporated, San Diego, CA (US)

(72) Inventors: Anthony Fanous, San Diego, CA (US); Cheol Hee Park, San Diego, CA (US); Reza Shahidi, San Diego, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,220

(22) Filed: Jan. 29, 2015

(65) Prior Publication Data

US 2016/0227557 A1 Aug. 4, 2016

(51) Int. Cl.
*H04W 72/12* (2009.01)
*H04W 72/04* (2009.01)
(Continued)

(52) U.S. Cl.
CPC ... *H04W 72/1215* (2013.01); *H04W 72/0406* (2013.01); *H04W 72/10* (2013.01); *H04W 88/06* (2013.01)

(58) Field of Classification Search
CPC ......... H04W 72/1215; H04W 72/0406; H04W 72/10; H04W 48/18; H04W 88/06;
(Continued)

(56) References Cited

U.S. PATENT DOCUMENTS 8,400,906 B2   3/2013   Lee et al.
8,547,989 B2   10/2013  Dayal et al.
(Continued)

FOREIGN PATENT DOCUMENTS

WO   2013185786 A1   12/2013

OTHER PUBLICATIONS

Ericsson St., et al., "P-MPR Definition and Applicability for HSPA," 3GPP Draft; R4-126293 HSPA PMPR Definition A, 3rd Generation Partnership Project-(3GPP)t Mobile Competence Centre; 650t Route Des Lucioles; F-06921 Sophia-Antipolis Cedex; France, vol. RAN WG4, no. New Orleans, LA, USA; 20121112-20121116, Nov. 5, 2012 (Nov. 5, 2012), XP050673857, Retrieved from the Internet: URL:http://www.3gpp.org/ftp/tsg_ran/WG4_Radio/TSGR4_65/Docs/ [retrieved on Nov. 5, 2012]section 2.1.
(Continued)

*Primary Examiner* — Hirdepal Singh
(74) *Attorney, Agent, or Firm* — The Marbury Law Group, PLLC

(57) ABSTRACT

Methods and devices are disclosed for enabling improved performance on a multi-subscriber identification module (multi-SIM) wireless communication device. The wireless communication device may detect transmit activity on a modem stack associated with the first SIM, and detect a communication activity scheduled on a modem stack associated with the second SIM having a higher priority. If the transmit activity on the modem stack of the first SIM will impede the communication activity, the wireless device may identify subframes on the modem stack associated with the first SIM that overlap in time with the communication activity and for each identified subframe, blank symbols that conflict with the communication activity to develop a partially blanked subframe. The partially blanked subframe may be transmitted according to a blanking policy.

28 Claims, 9 Drawing Sheets

(51) Int. Cl.
  *H04W 72/10* (2009.01)
  *H04W 88/06* (2009.01)
(58) Field of Classification Search
  CPC . H04W 8/183; H04W 68/005; H04W 76/025; H04W 24/02; H04W 52/0209; H04W 52/04; H04W 52/146; H04W 52/243; H04W 52/38
  See application file for complete search history.

(56) References Cited

U.S. PATENT DOCUMENTS

| | | | | |
|---|---|---|---|---|
| 9,026,125 | B2* | 5/2015 | Dhanda | H04W 52/38 455/452.2 |
| 2013/0150036 | A1* | 6/2013 | Pattaswamy | H04W 8/183 455/435.1 |
| 2013/0203461 | A1* | 8/2013 | Li | H04W 88/06 455/552.1 |
| 2013/0208587 | A1 | 8/2013 | Bala et al. | |
| 2013/0227062 | A1* | 8/2013 | Lee | H04L 65/4084 709/217 |
| 2013/0235814 | A1* | 9/2013 | Wietfeldt | H04W 16/14 370/329 |
| 2013/0316718 | A1* | 11/2013 | Hsu | H04W 72/1278 455/450 |
| 2014/0169347 | A1* | 6/2014 | Lamazure | H04B 17/382 370/337 |
| 2014/0213210 | A1 | 7/2014 | Li et al. | |
| 2014/0226575 | A1 | 8/2014 | Davydov et al. | |
| 2014/0233466 | A1 | 8/2014 | Pourahmadi et al. | |
| 2014/0369278 | A1 | 12/2014 | Song et al. | |
| 2015/0257099 | A1* | 9/2015 | Su | H04W 52/0216 455/452.1 |
| 2015/0365216 | A1* | 12/2015 | Chen | H04L 5/0053 370/329 |

OTHER PUBLICATIONS

International Search Report and Written Opinion—PCT/US2015/063666—ISA/EPO—Feb. 29, 2016.

\* cited by examiner

SYSTEM AND METHODS FOR PROVIDING A TRANSMISSION SKIPPING POLICY TO IMPROVE PERFORMANCE IN A MULTI-SUBSCRIBER IDENTITY MODULE (SIM) WIRELESS COMMUNICATION DEVICE

BACKGROUND

Multi-SIM (subscriber identification module) wireless devices have become increasing popular because of their flexibility in service options and other features.

In various types of multi-SIM wireless communication devices, each modem stack associated with a subscription may store information provisioned by a respective network operator in a SIM, which may allow the SIM to support use of various different communication services. For example, various wireless networks may be configured to handle different types of data, use different communication modes, implement different radio access technologies, etc. One type of multi-SIM wireless device, referred to as a dual-SIM dual-active (DSDA) device, is typically configured with separate transmit/receive chains associated with each SIM, thereby allowing simultaneous active connections with the networks corresponding to two SIMs. Some DSDA devices, referred to as single-transmit DSDA devices, are configured with separate receive chains associated with each SIM, but a single shared transmit chain. The single-transmit configuration reduces hardware costs and power requirements of the wireless communication device.

In both DSDA device configurations, potential conflicts between activities on the separate RF resources may arise during simultaneous communications. For example, the transmit circuitry associated with one SIM may cause desense to the receive circuitry associated with another SIM based on their coexistence and proximity within the same device. In another example, in a single-transmit DSDA device, timing collisions may arise between transmissions. To mitigate these conflict scenarios, a DSDA device may stop the lower priority communication by blanking transmissions in the uplink. For example, in simultaneous communication activities on a Long Term Evolution (LTE) network and a GSM network, the GSM communication activity (e.g., a voice call) is typically allocated the higher priority, with LTE uplink blanking. While blanking LTE transmissions at a symbol level may always provide better throughput on the downlink, in the uplink the better throughput result depends on whether a base station (i.e., eNodeB) is capable of discontinuous transmission (DTX) detection (i.e., differentiating sub-frames that were not received due to link failure versus due to DTX). However, there is no convenient mechanism by which a DSDA device may determine whether a particular base station/eNodeB is capable of DTX detection to guide this switching.

SUMMARY

Systems, methods, and devices of various embodiments enable a multi-SIM wireless communication device on which at least a first SIM and second SIM are respectively associated with a first radio frequency (RF) receive resource and a second RF receive resource, to improve performance when transmit activity is detected on a modem stack associated with the first SIM and a higher priority communication is scheduled on a modem stack associated with the second SIM. Various embodiments may also include determining whether the transmit activity will impede the higher priority communication activity. In response to determining that the transmit activity will impede the higher priority communication activity, various embodiment methods may include identifying subframes on the modem stack associated with the first SIM that overlap in time with the scheduled communication activity, and for each identified subframe, blanking symbols that conflict with the scheduled communication activity to develop a partially blanked subframe. Various embodiments may also include selecting whether to transmit each partially blanked subframe to a network associated with the first SIM based on a blanking policy.

In some embodiment systems, methods and devices, selecting whether to transmit each partially blanked subframe based on the blanking policy may include, for each partially blanked subframe, determining whether the partially blanked subframe is carrying control information, and transmitting the partially blanked subframe to the network associated with the first SIM if the partially blanked subframe is carrying control information.

In some embodiment systems, methods and devices, selecting whether to transmit each partially blanked subframe based on the blanking policy may include, for each partially blanked subframe, determining whether any blanked symbol is carrying a demodulation reference signal (DMRS), and preventing transmission of the partially blanked subframe in response to determining that a blanked symbol in the partially blanked subframe is carrying a DMRS.

In some embodiment systems, methods and devices, selecting whether to transmit each partially blanked subframe based on the blanking policy may include, for each partially blanked subframe, determining whether the partially blanked subframe is carrying user data, and in response to determining that the partially blanked subframe is carrying user data, retrieving a modulation coding scheme (MCS) value associated with the transmit activity on the modem stack associated with the first SIM and identifying an allowed number of blanked symbols corresponding to the MCS value. In some embodiment systems, methods and devices, the allowed number of blanked symbols may be a maximum blanking threshold for avoiding transmission failure.

In some embodiment systems, methods and devices selecting whether to transmit each partially blanked subframe based on the blanking may include, for each partially blanked subframe, counting the blanked symbols, determining whether the count of blanked symbols is less than or equal to the allowed number of blanked symbols, and transmitting the partially blanked subframe to the network associated with the first SIM in response to determining that the count of blanked symbols is less than or equal to the allowed number of blanked symbols. In some embodiment systems, methods and devices selecting whether to transmit each partially blanked subframe based on the blanking policy may include, for each partially blanked subframe, preventing transmission of the partially blanked subframe in response to determining that the count of blanked symbols is not less than or equal to the allowed number of blanked symbols. In some embodiment systems, methods and devices the allowed number of blanked symbols corresponding to an MCS value less than or equal to 2 may be 6 symbols. In some embodiment systems, methods and device, the allowed number of blanked symbols corresponding to an MCS value greater than 2 and less than or equal to 10 may be 4 symbols. In some embodiment systems, methods and devices the allowed number of blanked symbols corresponding to an MCS value greater than 10 and less than or equal to 15 may be 2 symbols. In some embodiment systems, methods and devices the network associated with the first SIM may employ a Long Term Evolution (LTE) radio access technology. In some embodiment systems, methods and devices, the communication activity scheduled on a modem stack associated with the second SIM may include a voice or data communication on a network that employs a GSM or UMTS radio access technology.

In some embodiment systems, methods and devices, determining whether the transmit activity will impede the higher priority communication activity may include determining whether the higher priority communication activity is a transmit activity scheduled to be simultaneous with the transmit activity on the modem stack associated with the first SIM, and determining whether the transmit activity for the first SIM will create radio interference for the higher priority communication activity in response to determining that simultaneous transmit activity is scheduled. In some embodiment systems, methods and devices, determining whether the transmit activity will impede the higher priority communication activity may include determining whether the higher priority communication activity is a receive activity scheduled to be simultaneous with the transmit activity on the modem stack associated with the first SIM, and determining whether the transmit activity for the first SIM will cause desense to the higher priority communication activity in response to determining that the receive activity is scheduled to be simultaneous with the transmit activity on the modem stack associated with the first SIM.

In some embodiment systems, methods and devices, determining whether the transmit activity will impede the higher priority communication activity may include determining whether the first SIM and second SIM are associated with a shared radio frequency (RF) transmit resource, and determining whether timing for access to the shared transmit resource scheduled for the higher priority communication activity conflicts with count of blanked symbols allocation of the shared transmit resource to the modem stack associated with the first SIM. In some embodiment systems, methods and devices, preventing transmission of the partially blanked subframe may include triggering a discontinuous transmission (DTX) mode, and invoking signaling that indicates a lack of voice data for transmission in the uplink.

Various embodiments include a wireless communication device including a wireless communication device configured to use at least a first subscriber identity module (SIM) and a second SIM associated with a shared radio frequency (RF) resource, and a processor configured with processor-executable instructions to perform operations of the methods described above. Various embodiments also include a non-transitory processor-readable medium on which is stored processor-executable instructions configured to cause a processor of a wireless communication device to perform operations of the methods described above. Various embodiments also include a wireless communication device having means for performing functions of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features.

DETAILED DESCRIPTION

Figure 1A:
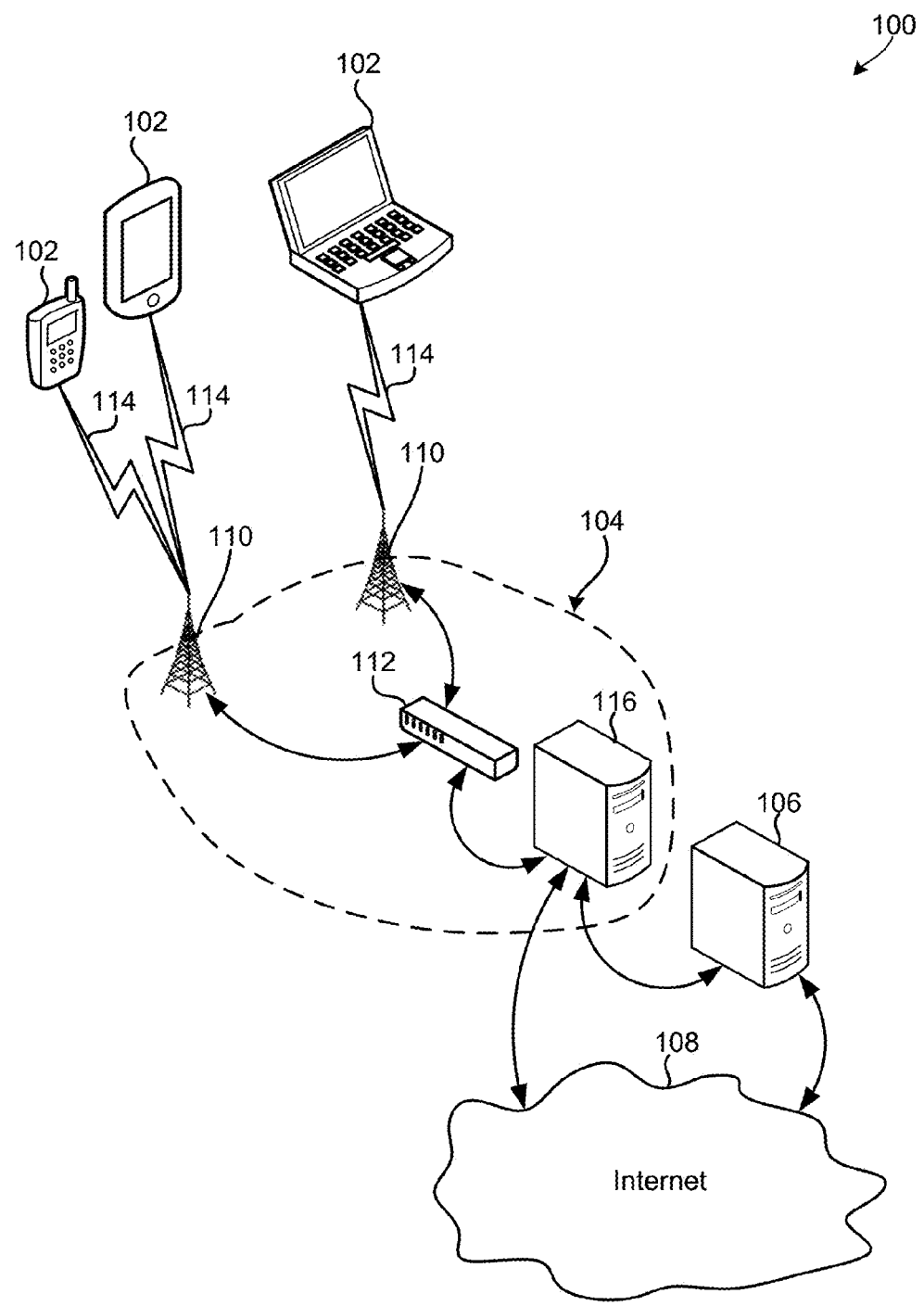
FIG. 1A is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

In an LTE network, blanking transmissions may occur at any of a number of levels based on the variety of options for breakdown of the LTE radio frame structure. For example, at the sub-frame level, if any part of an LTE subframe conflicts with GSM activity, the whole sub-frame may be blanked (i.e., sub-frame not transmitted). At the symbol level, only the single carrier frequency division multiple access (SC-FDMA) symbols (if uplink) or orthogonal frequency-division multiple access (OFDMA) symbols (if downlink) that conflict with GSM activity are blanked (i.e., a partial sub-frame is transmitted). The various embodiments improve performance of a multi-SIM multi-active (MSMA) wireless communication device in which a conflict scenario requires blanking or reducing transmission associated with a first SIM during a higher priority activity associated with a second SIM by dynamically selecting a blanking mode that minimizes loss in throughput on the first transmission. Specifically, in each uplink LTE subframe in which data conflicts with a higher priority communication activity (e.g., GSM), the blanking policy dictates whether the device should use symbol or subframe level blanking, and is applicable regardless of whether the eNodeB is capable of DTX-detection.

A multi-SIM, multi-active (MSMA) device may initially identify the symbols that conflict with the higher priority communication activity to develop a partially blanked subframe, and select whether to transmit that partially blanked subframe (applying symbol blanking) or prevent transmission of the partially blanked subframe (applying subframe blanking). To perform this selection, the device may identify various criteria about the partially blanked subframe, such as whether the subframe is carrying only control information (i.e., the Physical Uplink Control Channel (PUCCH) in an LTE system) or user data (i.e., in Physical Uplink Shared Channel (PUSCH) in an LTE system), whether any blanked symbol is a symbol that is used to carry a demodulation reference signal (DMRS), an applicable modulation coding scheme (MCS) value, and an allowable number of blanked subframes corresponding to the MCS value. Using these criteria, the MSMA device may select a level of blanking that should be used for the transmit activity associated with the first SIM. As a result, the MSMA device may transmit or prevent the transmission of the partially blanked subframe to the network associated with the first SIM.

In various embodiments, when a first SIM is engaged in a data communication on a high-speed network (e.g., an LTE communication), a higher priority communication may be scheduled on a network associated with a second SIM that creates a conflict scenario. In a MSMA device, such as a DSDA device, either with separate or shared transmit chains, such conflict scenarios may include predicted coexistence between the transmit activity on the first SIM and scheduled higher priority communication on the second SIM. For example, coexistence may cause radio interference between simultaneous transmissions on the two different networks respectively associated with the first SIM and second SIM and/or desense to receive activity scheduled on the second SIM resulting from the simultaneous transmit activity associated with the first SIM. Further, in a single-transmit DSDA device, conflict scenarios may include simultaneous transmissions scheduled for the first and second SIMs, each requiring use of the shared transmit resource.

All of these conflict scenarios may require that the ongoing transmission associated with the first SIM be temporarily cancelled (e.g., blanked) or reduced in order to remove impediments to the higher priority activity associated with the second SIM. The radio access technology associated with the first SIM may be configured to support multiple levels of uplink blanking/power reduction, including at the subframe level and at the symbol level. While uplink blanking/power reduction at each level may have benefits and constraints, the particular level that best suits an uplink transmission may depend on capabilities of the base station, which are not accessible to a wireless device. Accordingly, a blanking policy may control the type of uplink blanking/power reduction to be applied independent of base station capabilities.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual-active device," and "DSDA device" are used interchangeably to describe a wireless device that is configured with more than one SIM and is capable of independently handling communications with networks of all subscriptions.

As used herein, the terms "wireless network," "cellular network," "system," "public land mobile network," and "PLMN" are used interchangeably to describe a wireless network of a carrier associated with a wireless device and/or subscription on a wireless device, and/or roaming partners of the wireless network.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), CDMA2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for LTE and GSM-type and/or UMTS-type networks, but may be applied to networks using any other radio technology or protocol.

An example GSM network may operate on any of a number of GSM bands (e.g., GSM 900, GSM 850, etc.), each of which cover multiple radio frequency (RF) channels identified by absolute radio frequency channel numbers (ARFCNs). The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band.

A network in the various embodiments may be a 4G network designed for high speed data applications as an extension of UMTS (based on 3GPP standard) and an extension of 1×EV-DO (based on 3GPP2 standard). LTE networks may operate to provide data rates of about 300 Mbps data rate in the downlink and about 75 Mbps in the uplink using multiple access technologies. Specifically, LTE networks may use orthogonal frequency division multiple access (OFDMA) for the downlink (i.e., multiple narrow band sub-carriers spread over a wide channel bandwidth) and single-carrier frequency division multiple access (SC-FDMA) for the uplink. For 3GPP networks, LTE radio transmission and reception characteristics may be found in TS 36.101, entitled "LTE; Evolved Universal Terrestrial Radio Access (E-UTRA); User Equipment (UE) radio transmission and reception Evolved Universal Terrestrial Radio Access (E-UTRA); User Equipment (UE) radio transmission and reception (Release 9)." The LTE E-UTRA Absolute Radio Frequency Channel Number (EUARFCN) may be a number within 0-65535 and reflects the center frequency of an LTE carrier. In describing various embodiments, the terms "channel," "frequency," and "ARFCN" may be used interchangeably and may refer to channels in GSM bands, and/or channels in other network bands (i.e., UARFCNs for UMTS networks, EUARFCNs for LTE networks, etc.).

In various embodiments, a DSDA device may refer to a wireless device in which two SIMs are configured to use separate transmit and/or receive circuitries (i.e., RF resources). Thus, in some DSDA devices, the SIMs may simultaneously operate in any of a variety of modes, such as active/connected mode (i.e., transmitting and/or receiving data), idle mode, etc. In some DSDA devices, the separate RF resources that are assigned to each SIM may be limited to the receive chain, with the SIMs configured to share a single transmit chain. Other multi-SIM wireless communication devices may be configured to operate more than two SIMs in simultaneous active connections, such as by providing a separate transceiver for each of at least three SIMs.

The SIMs in a multi-SIM wireless communication device may be associated with the same or different PLMNs, each of which may have more than one wireless network. Each SIM is generally provisioned by a service provider with a list of preferred PLMNs from which the wireless communication device can receive service (i.e., a home PLMN and roaming partner PLMNs). In some embodiments, the wireless device processor may access non-volatile memory associated with a given one of the SIMs to identify supported radio access technologies and the corresponding enabled frequency bands (and ARFCNs/UARFCNs/EUARFCNs/channels in each band).

Various embodiments may be implemented within a variety of communication systems, such as the example communication system 100 illustrated in FIG. 1A. The communication system 100 may include one or more wireless devices 102, a telephone network 104, and network servers 106 coupled to the telephone network 104 and to Internet 108. In some embodiments, the network server 106 may be implemented as a server within the network infrastructure of the telephone network 104.

A typical telephone network 104 may include a plurality of cell base stations 110 coupled to a network operations center 112, which operates to connect voice and data calls between the wireless devices 102 (e.g., tablets, laptops, cellular phones, etc.) and other network destinations, such as via telephone land lines (e.g., a POTS network, not shown) and the Internet 108. The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

In general, any number of wireless networks may be deployed in a given geographic area. Each wireless network may support one or more radio access technology (RAT), which may operate on one or more frequency (also referred to as a carrier, channel, frequency channel, etc.) in the given geographic area in order to avoid interference between wireless networks of different RATs.

Upon power up, the wireless device 102 may search for wireless networks from which the wireless device 102 can receive communication service. In various embodiments, the wireless device 102 may be configured to prefer LTE networks when available by defining a priority list in which LTE frequencies occupy the highest spots. The wireless device 102 may perform registration processes on one of the identified networks (referred to as the serving network), and the wireless device 102 may operate in a connected mode to actively communicate with the serving network. Alternatively, the wireless device 102 may operate in an idle mode and camp on the serving network if active communication is not required by the wireless device 102. In the idle mode, the wireless device 102 may identify all RATs in which the wireless device 102 is able to find a "suitable" cell in a normal scenario or an "acceptable" cell in an emergency scenario, as specified in the LTE standards, such as 3GPP TS 36.304 version 8.2.0 Release 8, entitled "LTE; Evolved Universal Terrestrial Radio Access (E-UTRA); User Equipment (UE) procedures in idle mode."

The wireless device 102 may camp on a cell belonging to the RAT with the highest priority among all identified. The wireless device 102 may remain camped until either the control channel no longer satisfies a threshold signal strength or a cell of a higher priority RAT reaches the threshold signal strength. Such cell selection/reselection operations for the wireless device 102 in the idle mode are also described in 3GPP TS 36.304 version 8.2.0 Release 8.

The wireless device 102 may be configured with multi-mode capabilities and may include multiple transceivers for communicating with different wireless networks over different wireless links/RATs. For example, the first wireless device 102 may be configured to communicate over multiple wireless data networks on different subscriptions, such as in a dual-SIM wireless device. In particular, the first wireless device 102 may be configured with dual-SIM dual-active (DSDA) capabilities, which may enable the first wireless device 102 to simultaneously participate in two independent communications sessions.

For clarity, while the techniques and embodiments described herein relate to a wireless device configured with at least one GSM subscription, they may be extended to subscriptions on other radio access networks (e.g., UMTS/WCDMA, LTE, CDMA, etc.).

Figure 1B:
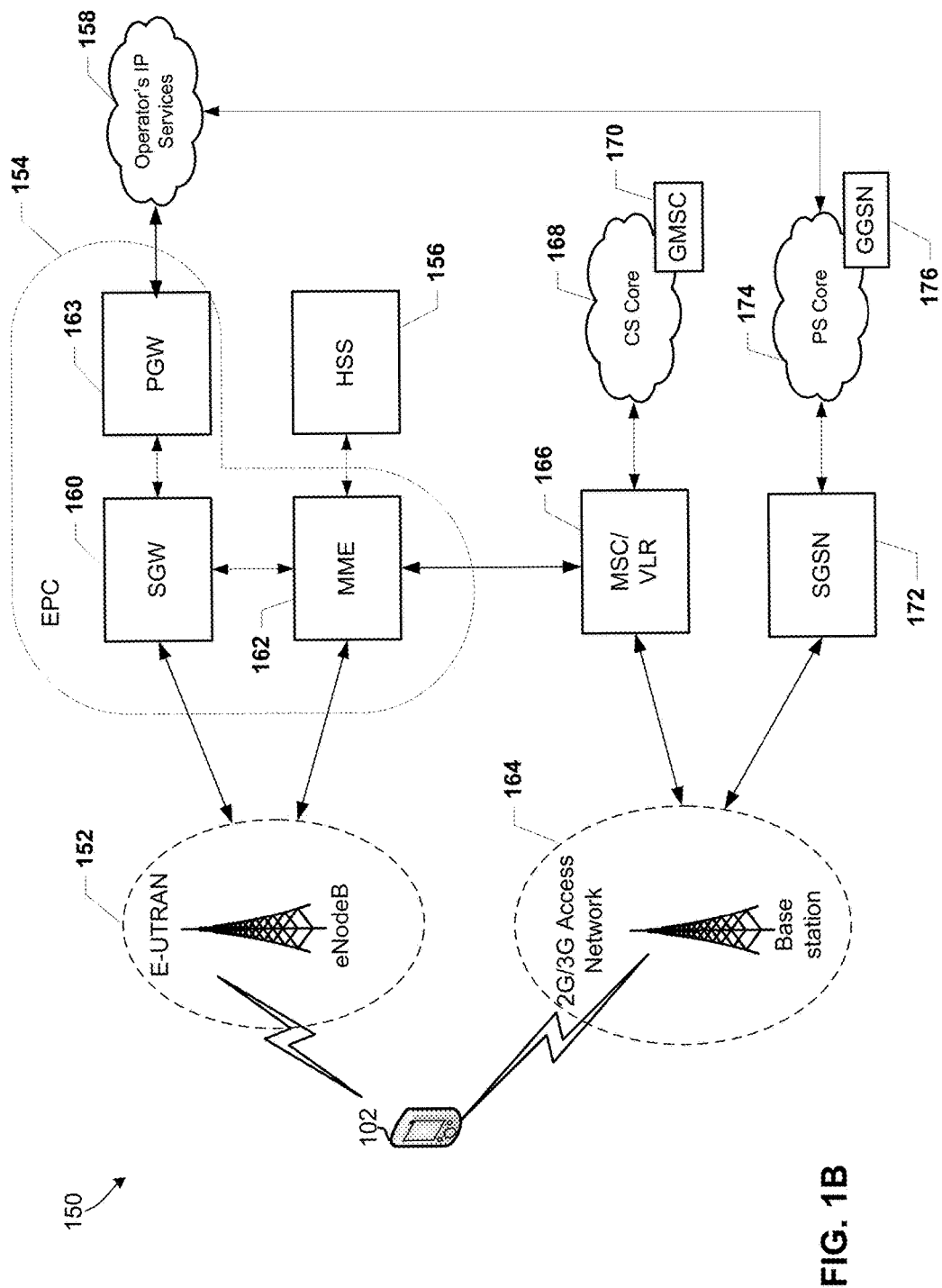
FIG. 1B is a block diagram of network architecture of systems suitable for use with the various embodiments.

FIG. 1B illustrates a network architecture 150 that includes an Evolved Packet System (EPS). With reference to FIGS. 1A-1B, in the network architecture 150, the wireless communication device 102 may be connected to an LTE access network, for example, an Evolved UMTS Terrestrial Radio Access Network (E-UTRAN) 152. In the various embodiments, the E-UTRAN 152 may be a network of LTE base stations (i.e., eNodeBs) (e.g., 110 in FIG. 1A), which may be connected to one another via an X2 interface (e.g., backhaul) (not shown).

In various embodiments, each eNodeB may provide to wireless devices an access point to an LTE core (e.g., an Evolved Packet Core). For example, the EPS in the network architecture 150 may further include an Evolved Packet Core (EPC) 154 to which the E-UTRAN 152 may connect. In various embodiments, the EPC 154 may include at least one Mobility Management Entity (MME) 162, a Serving Gateway (SGW) 160, and a Packet Data Network (PDN) Gateway (PGW) 163.

In various embodiments, the E-UTRAN 152 may connect to the EPC 154 by connecting to the SGW 160 and to the MME 162 within the EPC 154. The MME 162, which may also be logically connected to SGW 160, may handle tracking and paging of the wireless device 102 and security for E-UTRAN access on the EPC 154. The MME 162 may be linked to a Home Subscriber Server (HSS) 156, which may support a database containing user subscription, profile, and authentication information. Further, the MME 162 provides bearer and connection management for user IP packets, which are transferred through the SGW 160. In various embodiments, the SGW 160 may be connected to the PGW 163, which may provide IP address allocation to the wireless device 102, as well as other functions. The PGW 163 may be connected to the Operator's IP Services 158, which may include, for example, the Internet, an Intranet, an IP Multimedia Subsystem (IMS), a PS Streaming Service (PSS), etc.

The network architecture 150 may also include circuit-switched (CS) and packet-switched (PS) networks. In some embodiments, the wireless device 102 may be connected to the CS and/or PS packet switched networks by connecting to a legacy 2G/3G access network 164, which may be one or more UTRAN, GSM EDGE Radio Access Network (GERAN), etc. In the various embodiments, the 2G/3G access network 164 may include a network of base stations (e.g., base transceiver stations (BTSs), nodeBs, radio base stations (RBSs), etc.) (e.g., 110), as well as at least one base station controller (BSC) or radio network controller (RNC). In various embodiments, the 2G/3G access network 164 may connect to the circuit switched network via an interface with (or gateway to) a Mobile switching center (MSC) and associated Visitor location register (VLR), which may be implemented together as MSC/VLR 166. In the CS network, the MSC/VLR 166 may connect to a CS core 168, which may be connected to external networks (e.g., the public switched telephone network (PSTN)) through a Gateway MSC (GMSC) 170.

In various embodiments, the 2G/3G access network 164 may connect to the PS network via an interface with (or gateway to) a Serving GPRS support node (SGSN) 172, which may connect to a PS core 174. In the PS network, the PS core 174 may be connected to external PS networks, such as the Internet and the Operator's IP services 158 through a Gateway GPRS support node (GGSN) 176.

The LTE network (e.g., EPS) may co-exist in mixed networks with the CS and PS networks, with the MME 162 serving the wireless device 102 for utilizing PS data services over the LTE network, the SGSN 172 serving the wireless device 102 for utilizing PS data services in non-LTE areas, and the MSC/VLR 166 serving the wireless device 102 for utilizing voice services (CS data). In various embodiments, the wireless device 102 may be able to use a single RF resource for both voice and LTE data services by implementing circuit-switched fallback (CSFB) to switch between accessing the E-UTRAN 152 and the legacy 2G/3G access network 164.

Figure 2:
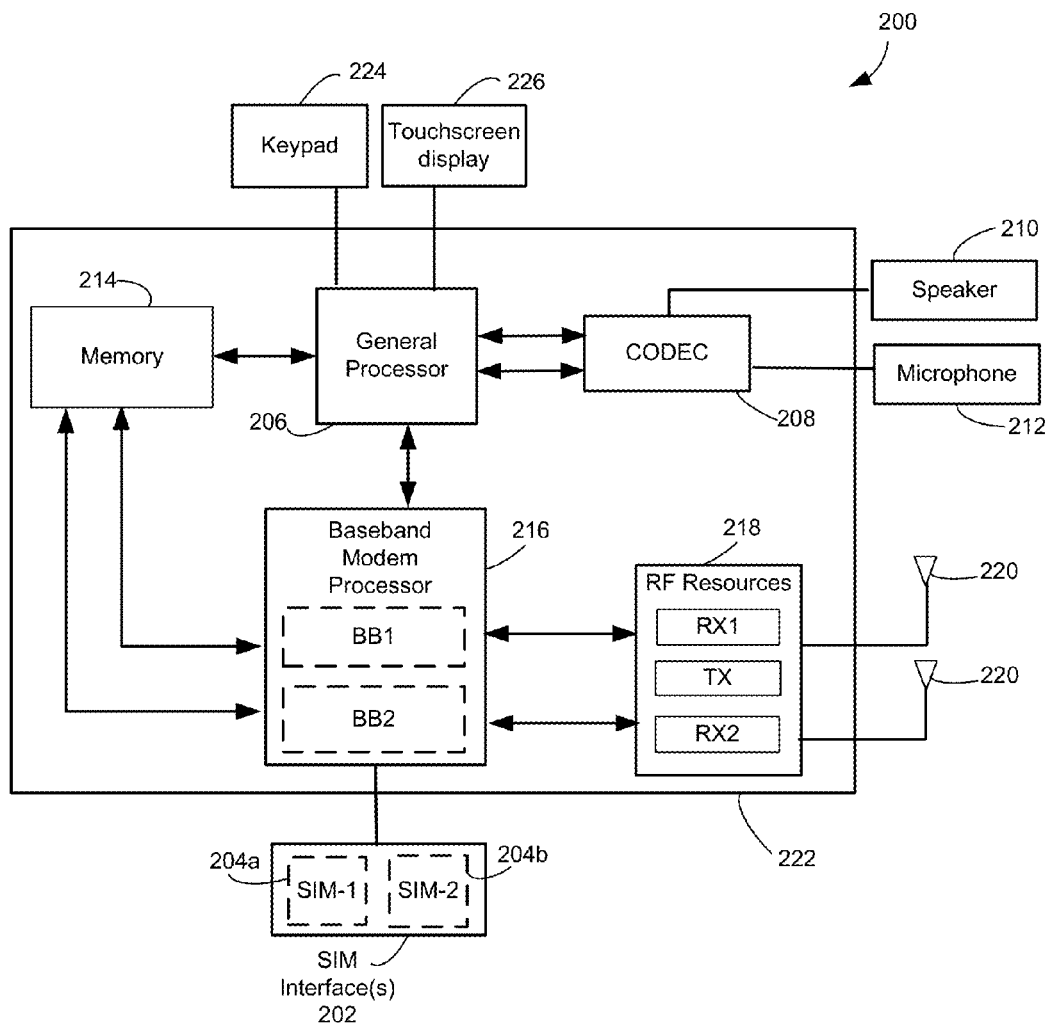
FIG. 2 is a block diagram illustrating a dual-SIM dual-active wireless communication device according to various embodiments.

FIG. 2 is a functional block diagram of a wireless device 200 suitable for implementing various embodiments. According to various embodiments, the wireless device 200 may be similar to one or more of the wireless devices 102 as described above with reference to FIGS. 1A and 1B. With reference to FIGS. 1A-2, the wireless device 200 may include a first SIM interface 202a, which may receive a first SIM 204a that is associated with a first subscription. The wireless device 200 may also include a second SIM interface 202b, which may receive a second SIM 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each of the SIM 204a, 204b may have a CPU, ROM, RAM, EEPROM, and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (IC-CID) SIM serial number may be printed on one or more of the SIMs 204a, 204b for identification. However, a SIM may be implemented within a portion of memory of the wireless device 200 (e.g., memory 214), and thus need not be a separate or removable circuit, chip or card.

The wireless device 200 may include at least one controller, such as a general purpose processor 206, which may be coupled to one or more coder/decoder (CODEC) 208. The CODEC 208 may in turn be coupled to a speaker 210 and a microphone 212. The general purpose processor 206 may also be coupled to the memory 214.

The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store application data, such as an array data structure.

The general purpose processor 206 and memory 214 may each be coupled to at least one baseband modem processor 216. Each of the SIMs 204a, 204b in the wireless device 200 may be associated with a baseband-RF resource chain that may include the baseband modem processor 216—which may perform baseband/modem functions for communicating with/controlling a RAT—and one or more amplifiers and radios, referred to generally herein as RF resources 218. In some embodiments, baseband-RF resource chains may share the baseband modem processor 216 (i.e., a single device that performs baseband/modem functions for all SIMs on the wireless device 200). In other embodiments, each baseband-RF resource chain may include physically or logically separate baseband processors (e.g., BB1, BB2).

The RF resources 218 (also referred to herein as RF receive resources and RF transmit resources) may be coupled to at least two wireless antennas 220a, 220b, and may perform transmit and/or receive functions for the wireless services associated with each of the SIM 204a, 204b of the wireless device 200. In some embodiments, the RF resources 218 may be coupled to the wireless antennas 220a, 220b for sending and receiving RF signals for the SIMs 204a, 204b, thereby enabling the wireless device 200 to perform simultaneous communications with separate networks and/or services associated with the SIMs 204a, 204b. The RF resources 218 may provide separate transmit and receive functionality, or may include a transceiver that combines transmitter and receiver functions. In some embodiments, one or both of the wireless antennas 220a, 220b may each represent a plurality of antennas associated with each RF resource 218, such as to support diversity reception.

In some embodiments, the general purpose processor 206, the memory 214, the baseband modem processor(s) 216, and the RF resources 218 may be included in the wireless device 200 as a system-on-chip 222. In some embodiments, the first and second SIMs 204a, 204b and their corresponding interfaces 202a, 202b may be external to the system-on-chip 222. Further, various input and output devices may be coupled to components of the system-on-chip 222, such as interfaces or controllers. Example user input components suitable for use in the wireless device 200 may include, but are not limited to, a keypad 224 and a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the wireless device 200 to enable communication between them, as is known in the art.

Functioning together, the two SIMs 204a, 204b, the baseband modem processor 216, the RF resources 218, and the wireless antennas 220a, 220b may constitute two or more RATs. For example, a SIM, baseband processor, and RF resource may be configured to support two different radio access technologies, such as GSM and WCDMA. More RATs may be supported on the wireless device 200 by adding more SIM cards, SIM interfaces, RF resources, and/or antennae for connecting to additional mobile networks.

Various embodiment wireless devices may have more than one antenna and/or other transmit chain components for performing transmit functions in an RF resource. The RF resources associated with a SIM may include one or more transmit chain, which may include, without limitation, components of the RF front end (including a transmitter unit), antennas, etc. The RF resources associated with a SIM may also include one or more receive chain that may include, without limitation, components of the RF front end, antennas, etc. In various embodiments, portions of the transmit and/or receive chains that make up an RF resource may be integrated into a single chip, or distributed over multiple chips. Also, a transmit chain, or portions of the transmit chain may be integrated into a chip along with other functions of the wireless device. The various embodiments may be used in wireless systems having a single transmit chain that makes up the RF transmit resource, and two or more antennas and/or receive chains that make up the RF receive resource(s). In the various embodiments, separate units of a baseband-modem processor (e.g., 216) of a multi-SIM device (e.g., 200) may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

In some embodiment networks, such as 2G/3G access networks configured in a GSM system, frequencies (e.g., ARFCNs) may be time divided into eight time slots, the sequence of which makes up a TDMA frame. TDMA frames may be grouped into multi-frames based on the type of data that is sent to/received from the network. Further, on each timeslot within a particular multi-frame, the TDMA frames may be allocated to logical channels that correspond to the type of data. Examples of such logical channels may include, for example, control channels (e.g., broadcast channels (BCH), common control channels (CCH), etc.) and traffic channels (TCH). Depending on the channel structure used by the base station subsystem, different time slots may carry different logical channels.

While described with respect to GSM and/or UMTS networks, these are merely examples of networks to which serving cells for associated with the modem stacks of various embodiments may belong.

An LTE network according to various embodiments may have a frame structure with a duration of 10 ms. The LTE frame may have 10 subframes each having a 1 ms duration, and each subframe may contain two slots each having a 0.5 ms duration. The LTE network may provide time and frequency sharing using either time division duplex (TDD) or frequency division duplex (FDD). Specifically, in an LTE FDD system, a wireless device may be allocated a pair of frequencies (i.e., a pair of frequency ranges each having 10 MHz bandwidth) to provide separate uplink and downlink resource. In such FDD systems, the entire radio frame of 10 ms is used simultaneously over downlink and uplink directions. In an LTE TDD system, the wireless device may be allocated the same frequency in the uplink and downlink, but may use different time slots of the radio frame to map various types of data. That is, in such TDD system the wireless device may use, for either uplink or downlink, the entire 20 MHz bandwidth associated with a particular LTE band. However, subframes 0 and 5 may be dedicated to only provide downlink communication, while sub frames 1 and 6 may be dedicated for control frames. The dedication of subframes 2, 3, 4 and 7, 8, 9 may be determined by the downlink to uplink switch point periodicity, which may be configured according to a standard.

The various embodiments may be applicable for systems in which transmit activity associated with a first SIM conflicts with a communication associated with a second SIM having higher priority.

In various embodiments, such conflicts may be avoided by blanking the transmission associated with the first SIM during periods in which the higher priority communication is scheduled. Since each SIM may enable communications on different RATs, the time units for the high priority communication on the network associated with the second SIM do not align with time units corresponding to uplink radio frames associated with the first SIM network.

Figure 3A:
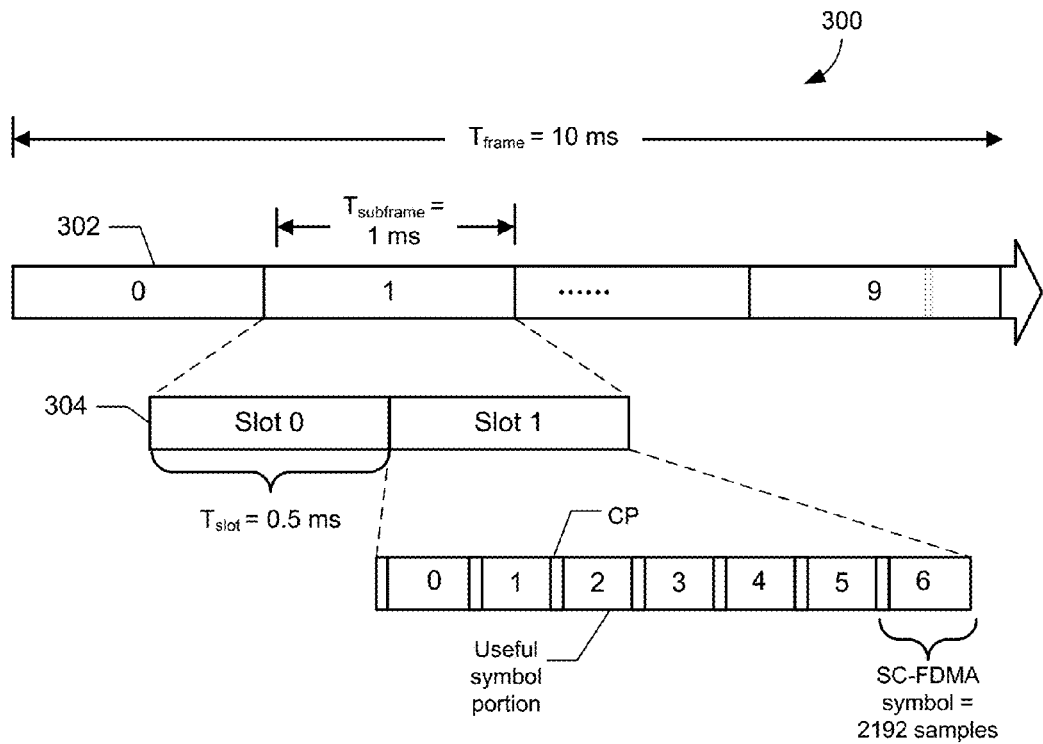
FIGS. 3A and 3B illustrate representative timelines showing radio frames associated with example networks that may be supported by SIMs of a dual SIM wireless communication device according to various embodiments.
Figure 3B:
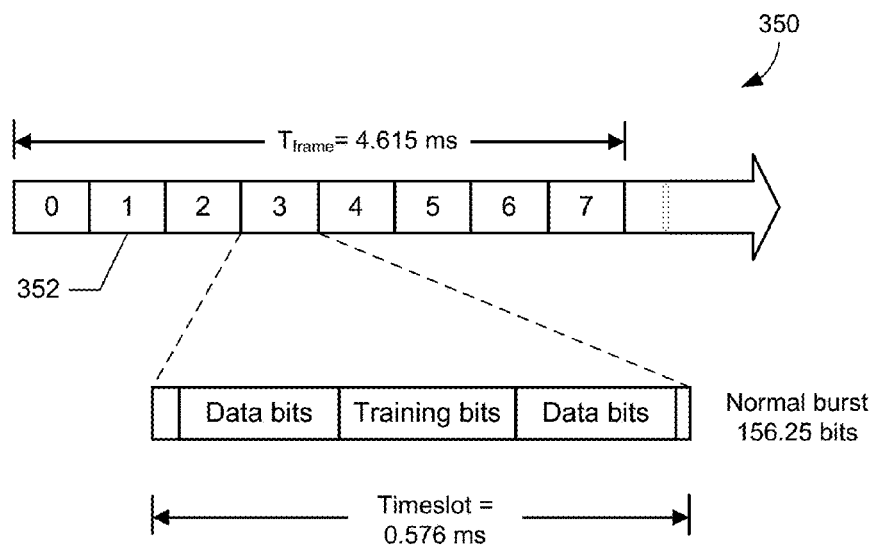

Example structures of radio frames are shown in FIGS. 3A and 3B. With reference to FIGS. 1-3B, a multi-SIM multi-active (e.g., DSDA) wireless device (e.g., 102, 200 in FIGS. 1A-2) may be configured to communicate with networks that allocate radio access using various frame structures, such as an LTE frame 300 and TDMA frame 350. As discussed above, the LTE frame 300 may contain ten subframes 302 (e.g., subframe 0-9) each having a duration of 1 ms, with each subframe having two slots 304 (e.g., slot 0, slot 1) that have durations of 0.5 ms. In various embodiments, each slot 304 in the LTE frame 300 may contain seven SC-FDMA symbols (e.g., symbol 0-6), and each symbol may contain 2192 samples (including cyclic prefix (CP) and useful symbol portion).

In various embodiments, symbols in the LTE frame 300 may be used to carry reference signals. In LTE uplink, a demodulation reference signal (DMRS) may be sent, which facilitates coherent demodulation of an associated uplink data channel (e.g., Primary Uplink Shared Channel (PUSCH)) or control channel (e.g., Primary Uplink Control Channel (PUCCH)). In the frequency domain, the DMRS may be mapped to the same set of physical resource blocks used for the corresponding PUSCH or PUCCH transmission with the same length expressed by the number of subcarriers, while in the time domain DMRS may be carried on the fourth SC-FDMA symbol in each slot.

The TDMA frame 350, which may be utilized in a GSM network, may contain eight timeslots (e.g., TS 0-7) 352, each having a duration of 0.576 ms. In various embodiments, each timeslot 352 may be used to carry 148 bits of information, the type of which may depend on the particular burst being used. For example, TS 3 may be used for a normal burst, and therefore may include data bits and training sequence bits, as well as others.

Therefore, avoiding conflict with the higher priority communication may involve selecting one of a number of levels for blanking the transmission associated with the first SIM (e.g., an LTE transmission). For example, the transmission associated with the first SIM may be blanked at the subframe level, at the slot level, at the symbol level, and/or at the sampling level.

For example, at the subframe level, any LTE subframe during in which a conflicting higher priority communication is scheduled to overlap may be blanked, even if the overlap only exists in part of the subframe. In various embodiments, blanking at the subframe level may be performed by scheduling the subframe in DTX mode. Similarly, at the slot level, for an LTE subframe during which the higher priority communication is scheduled, blanking may be applied to any slot (i.e., either or both slots) that overlaps with the scheduled higher priority communication.

At the symbol level (e.g., SC-FDMA symbol level for uplink), in each conflicting subframe, any symbol that conflicts with the scheduled higher priority communication may be blanked (i.e., transmission cancelled), thereby creating a partially blanked subframe. Similarly, at the sample level, in each conflicting symbol of each conflicting subframe, any sample that conflicts with the scheduled higher priority communication is scheduled may be blanked to also create a partially blanked subframe.

Various tradeoffs exist between the levels of blanking for an LTE transmission. For example, subframe and slot blanking are generally expedient, but may result in over-blanking in the LTE transmission, thereby causing a large loss of data. This loss may be particularly significant when the conflicting overlap with a scheduled higher priority communication is small. Alternatively, while symbol and sample blanking is more complex, thereby taking more time and energy to implement, such blanking typically is more precise by blanking only as necessary in the LTE transmission.

The use of symbol or sample level blanking therefore creates a partially blanked subframe, the transmission of which may succeed or fail as indicated by the cyclic redundancy check (CRC). In particular, successful transmission of a partially blanked subframe depends on the amount of blanking and the modulation coding scheme (MCS) value for the subframe, as assigned by the base station. The MCS value may be assigned by the base station, and sets forth the number of spatial streams, modulation type, provided on the radio link. In various embodiments, the MCS value represents a tradeoff between data rate and protection of data. That is, at a high MCS value, the modulation scheme/coding rate may allow large data transmissions that have a low degree of error protection, providing high throughput but with low levels of protection. If a failure rate is high (e.g., many CRC errors reported), the MCS value may be lowered, which provides a more protective modulation type/coding rate for smaller amounts of data, lowering the throughput.

Symbol blanking typically results in higher throughput than subframe blanking in the downlink, regardless of the particular LTE network. However, in uplink communication, subframe blanking typically results in higher throughput than symbol blanking for LTE networks that are capable of detecting the use of DTX on by wireless devices. That is, when an expected subframe is not transmitted on the uplink, a DTX detection-capable eNodeB may recognize such subframe as DTX instead of counting the subframe as a failed transmission, and therefore not reduce the MCS value for subsequent uplink transmissions from that wireless device. However, when a partially blanked subframe is transmitted on the uplink and fails (e.g., due to a high modulation coding scheme (MCS) value), such failure contributes to the Block Error Ratio (BLER) and reduces the MCS allocated for subsequent uplink transmissions from that wireless device, thereby reducing the throughput. In contrast, for LTE networks that are not capable of detecting the use of DTX by a wireless device, symbol blanking typically results in higher throughput. That is, when an expected subframe is not transmitted on the uplink, a DTX-incapable eNodeB may consider the subframe to have failed in the same manner as a partially blanked subframe that fails.

Therefore, the level at which LTE transmission blanking in the uplink should be performed to achieve maximum throughput may be based on a determination whether the eNodeB is capable of DTX detection. As such, various embodiments are directed to performing this determination.

In the various embodiments, a blanking policy that maximizes throughput independent of the capabilities of a base station may be applied to uplink transmissions. In particular, the blanking policy may be configured to avoid transmitting partially blanked subframes that are likely to fail, which degrades performance regardless of whether the base station is capable of DTX detection. In the various embodiments, efficiently preventing transmission associated with a first SIM may involve switching between at least two levels of blanking (e.g., subframe and symbol blanking). The switching between subframe blanking and symbol blanking may be implemented by the wireless device scheduling the partially blanked subframe in DTX mode or transmitting the partially blanked subframe.

In various embodiments, the blanking policy may be based on a predicted maximum number of symbols that may be blanked in a subframe without causing CRC failure. In the various embodiments, the blanking policy may include a plurality of predicted maximums, each corresponding to a different MCS level.

In various embodiments in which a wireless device (e.g., 200) is configured with multiple SIMs, each associated with independent RF receive resources and either independent RF transmit resources or a single shared RF transmit resource (e.g., a single-transmit DSDA device), performance improvements may be implemented by specifying amount of blanking or power reduction that should be applied to transmit activity associated with one SIM in order to avoid conflicts with higher priority activities on another SIM.

Figure 4A:
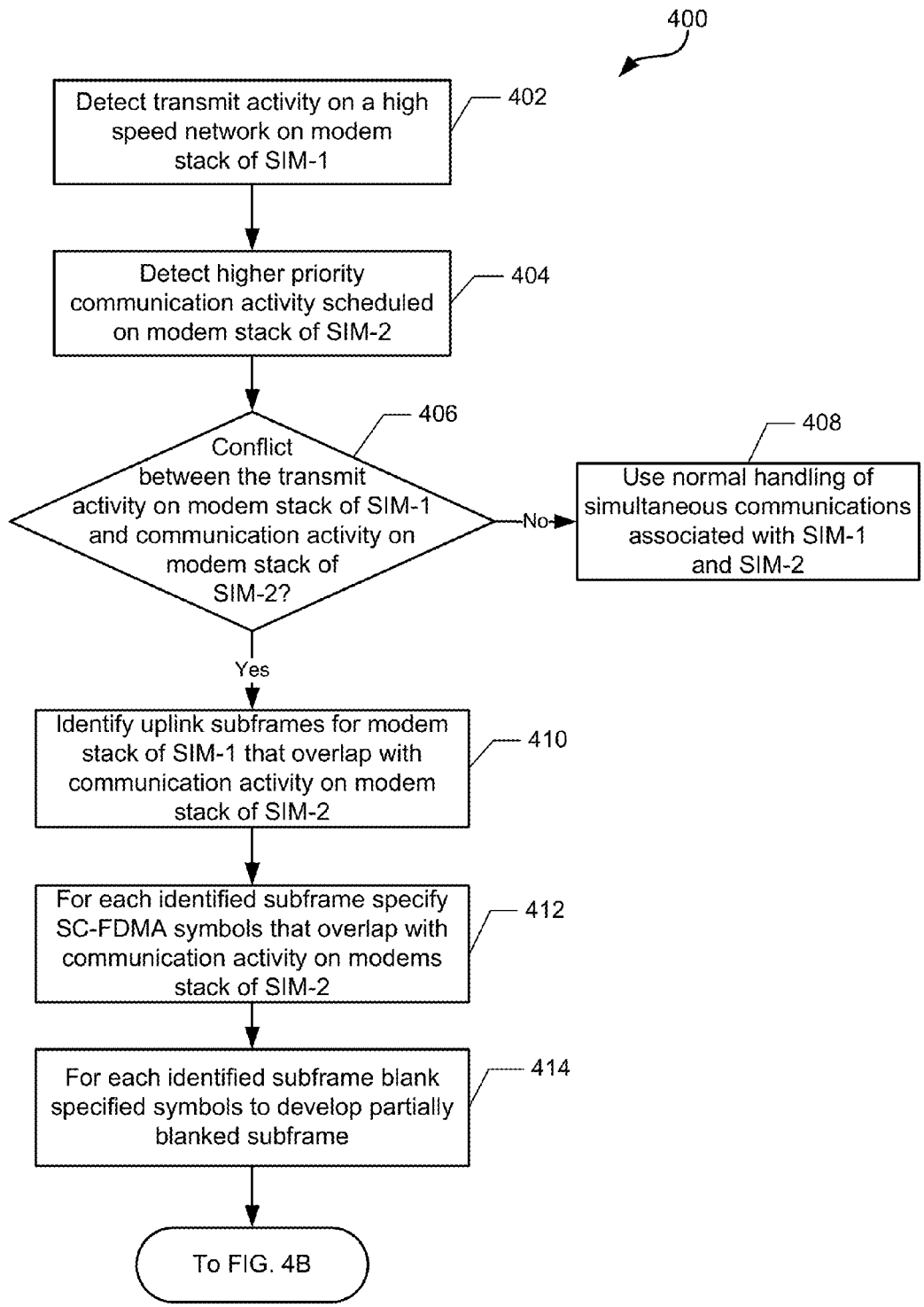
FIGS. 4A-4C are process flow diagrams illustrating a method for using transmission blanking to reduce conflicts between communication activities on an example dual-SIM wireless communication device according to various embodiments.
Figure 4B:
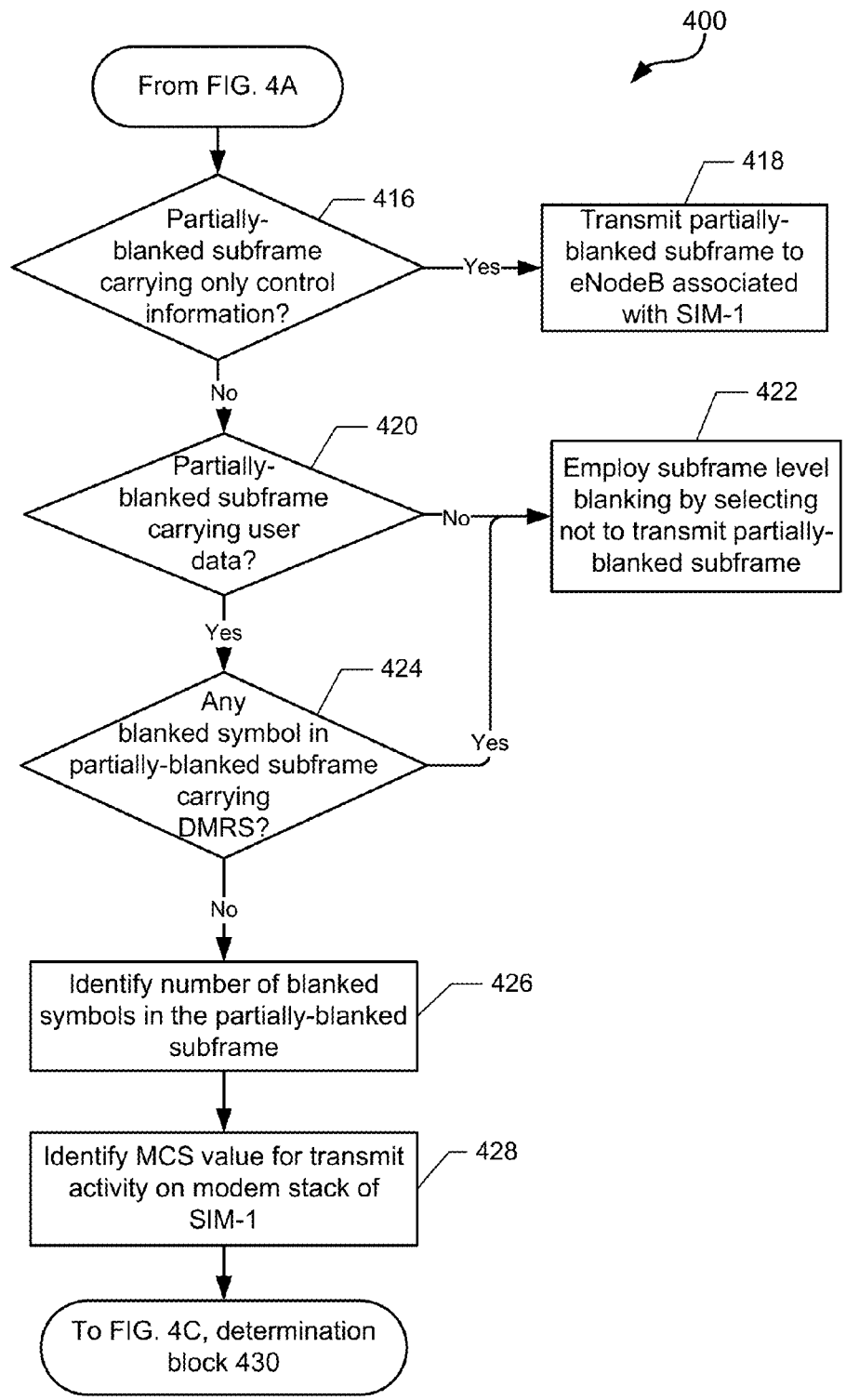
Figure 4C:
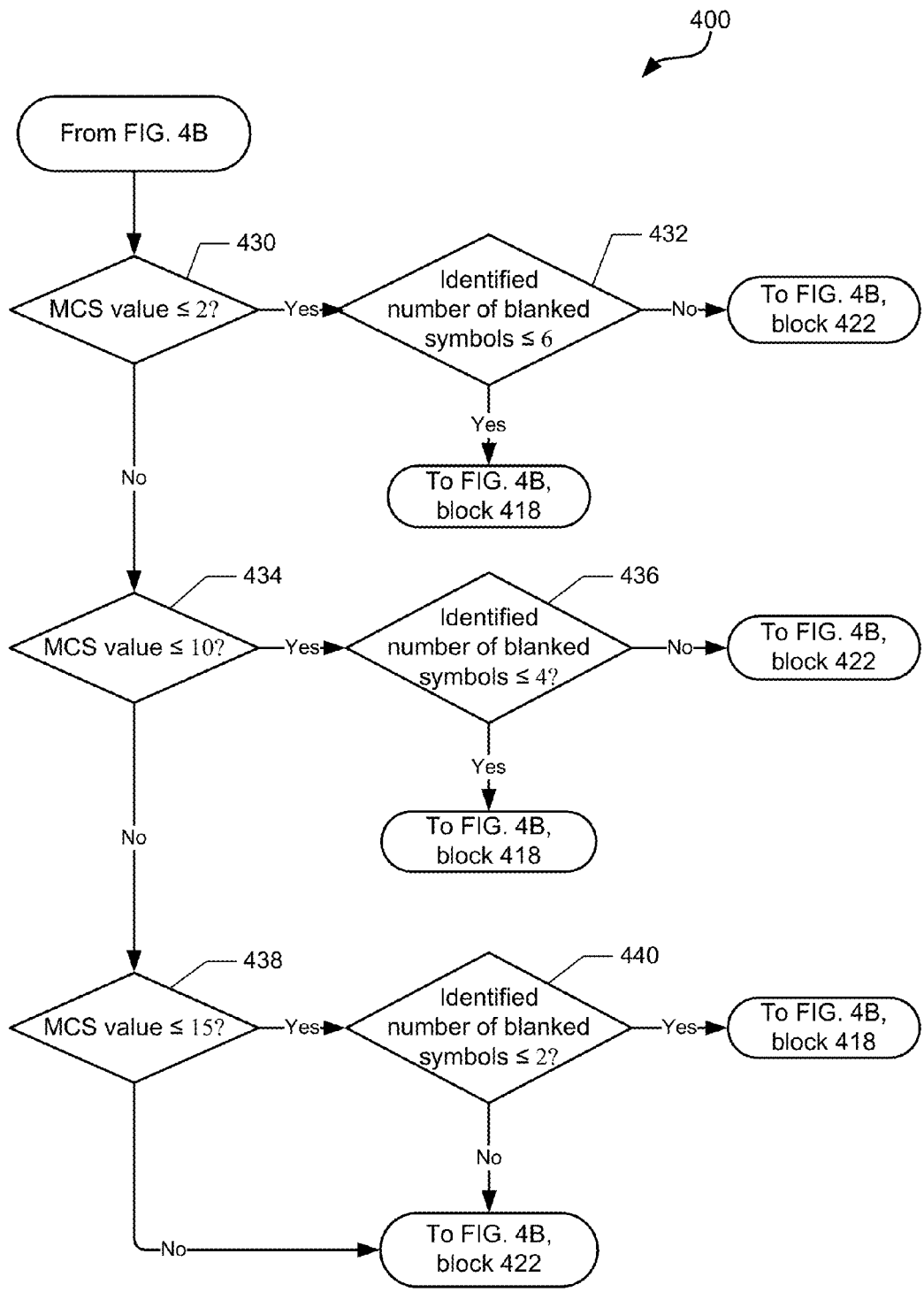

FIGS. 4A-4C illustrate a method 400 for improving efficiency and performance with respect to transmission on a multi-SIM multi-active (e.g., DSDA) wireless device (e.g., 102, 200 in FIGS. 1A-2) according to some embodiments. In various embodiments, the multi-SIM multi-active device may be configured with RF resources that include separate receive circuitries/RF receive resources for each SIM, and a single RF transmit resource that is shared between the multiple SIMs (e.g., a single-transmit DSDA device). In various embodiments, the operations of the method 400 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-4C, the wireless device processor may detect that a modem stack associated with a first SIM ("SIM-1") is participating in a transmit activity on a high speed network, for example, an LTE network (i.e., a network that supports peak data rates of at least 100 Mbit/s in the downlink and 50 Mbit/s in the uplink) in block 402. In block 404, the wireless device processor may detect a communication activity scheduled for the modem stack associated with the second SIM ("SIM-2") that has a higher priority than the transmit activity on the first SIM modem stack.

The references to the first SIM (SIM-1) and the second SIM (SIM-2) are arbitrary and used merely for the purposes of describing the embodiments, and the wireless device processor may assign any indicator, name, or other designation to differentiate the SIMs and associated modem stacks. Further, embodiment methods apply the same regardless of which SIM is involved in the communication activity on the high speed network. The wireless device (e.g., 102, 200 in FIGS. 1A-2) may have a layered software architecture to communicate with the first and second networks. The software architecture may be distributed among one or more baseband modem processor(s) 216, which may be part of and/or connected to the RF communication resources 218. In various embodiments, such a layered software architecture may include multiple protocol stacks, each of which may be associated with a different SIM. The protocol stacks may be implemented to allow modem operation using information provisioned on multiple SIMs. Therefore, a protocol stack that may be executed by a baseband modem processor is interchangeably referred to herein as a modem stack.

The higher priority of the communication activity for the second SIM may be for any of a variety of reasons. For example, in some embodiments such priority may be based on criteria associated with the activity itself (e.g., an active voice call) compared to the communication on the first SIM modem stack (e.g., a data session). In some embodiments, such priority may be based on the relatively infrequent opportunities associated with the activity and/or network compared to the communication activity on the first SIM modem stack using the high speed network.

In determination block 406, the wireless device processor may determine whether a conflict scenario exists between the transmit activity on the first SIM modem stack and the communication activity on the second SIM modem stack. In various embodiments, a conflict may be determined to exist for a number of reasons that may be applicable to typical DSDA devices, to single-transmit DSDA devices, and/or to both types of DSDA devices. Examples of conflict scenarios may include, but are not limited to, predicted desense to receive activity scheduled on the second SIM modem due to transmit activity associated with the first SIM, predicted radio interference from transmissions on relatively close frequency bands, sharing of transmission resources for simultaneously scheduled activity, etc.

In response to determining that no conflict scenario exists between the transmit activity on the first SIM modem stack and the communication activity on the second SIM modem stack (i.e., determination block 406="No"), the wireless device processor may use normal handling of simultaneous communications associated with the first and second SIMs in block 408. In response to determining a conflict scenario exists between transmit activity on the first SIM modem stack and the communication activity on the second SIM modem stack (i.e., determination block 406="Yes"), in block 410 the wireless device processor may identify uplink subframes in which overlap with the communication activity on the second SIM modem stack exists.

In block 412, for each identified subframe the wireless device processor may specify the SC-FDMA symbols that overlap with the communication activity on the second SIM modem stack. In block 414, for each identified subframe, the wireless device processor may develop a partially blanked subframe by blanking the specified symbols. Although referred to herein as symbol blanking, in some embodiments the specified symbols may be transmitted at reduced power instead of blanked. The nature of the type of conflict mitigation (e.g., blanking or reducing transmit power) may depend on any of a number of parameters, such as the type of conflict, configurations associated with the device, strength of the radio link, etc. As such, the term partially blanked subframe may also refer to a low power subframe developed by reducing transmit power for the specified symbols.

The wireless device processor may implement a blanking policy by proceeding to determination block 416 (FIG. 4B). Specifically, for each partially blanked subframe, the wireless device processor may determine whether the partially blanked subframe is only carrying control information (e.g., scheduling requests, acknowledgement messages, channel quality information, etc.) in determination block 416. In various embodiments in which the high speed network is an LTE network, such determination may involve determining whether the partially blanked subframe is being used to send the primary uplink control channel (PUCCH). In response to determining that the partially blanked subframe is only carrying control information (i.e., determination block 416="Yes"), in block 418 the wireless device processor may employ symbol level blanking, selecting to transmit the partially blanked subframe to a base station (e.g., eNodeB) of the network associated with the first SIM.

In response to determining that the partially blanked subframe is not carrying only control information (i.e., determination block 416="No"), the wireless device processor may determine whether the partially blanked subframe is carrying user data in determination block 420. In various embodiments in which the high speed network is an LTE network, such determination may involve determining whether the partially blanked subframe is being used to send the physical uplink shared channel (PUSCH). In response to determining that the partially blanked subframe is not carrying user data (i.e., determination block 420="No"), the wireless device processor may employ subframe level blanking by selecting not to transmit the partially blanked subframe in block 422. That is, the determination that the partially blanked subframe is not carrying control or user data (e.g., PUCCH or PUSCH), the wireless device processor may assume that the partially blanked subframe is carrying a random access preamble (e.g., being used for the physical random access channel (PRACH) in an LTE network). Since a random access preamble is typically retransmitted at an incremented power if not received by the base station, the wireless device processor may be configured to automatically employ subframe level blanking by selecting not to attempt to send the partially blanked subframe. In various embodiments, the wireless device processor may instead wait to resend the preamble at a later time (i.e., after conflict scenario with the higher priority activity is over).

In various embodiments, employing subframe level blanking by selecting not to transmit the partially blanked subframe may involve triggering a discontinuous transmission (DTX) mode for scheduling the partially blanked subframe. In the DTX mode, the wireless device may be configured to automatically blank transmit activity during periods in which voice data is not detected for uplink transmission. In order to prevent sending the partially blanked subframe, the wireless device processor may invoke DTX functionality, as well as the signaling that indicates a lack of voice data on the uplink In response to determining that the partially blanked subframe is carrying user data (i.e., determination block 420="Yes"), the wireless device processor may determine whether any blanked symbol in the partially blanked subframe is carrying a DMRS in determination block 424. As discussed, one symbol in each slot may be occupied by the DMRS, thereby providing two DMRS symbols per subframe. For an associated PUSCH, both DMRS symbols need to be transmitted in order for the base station to be able to decode the user data. Therefore, in response to determining that one or more blanked symbol of the partially blanked subframe is a DMRS symbol (i.e., determination block 424="Yes"), the wireless device processor may employ subframe level blanking by selecting not to transmit the partially blanked subframe in block 422.

In response to determining that no blanked symbol of the partially blanked subframe is carrying a DMRS (i.e., determination block 424="No"), in block 426 the wireless device processor may identify the number of blanked symbols in the partially blanked subframe. In block 428, the wireless device processor may identify an MCS value for the transmit activity on the modem stack associated with the first SIM. In various embodiments, the MCS value may have been provided by the base station (e.g., eNodeB) and stored in the first SIM or other memory.

Continuing to determination block 430 (FIG. 4C), the wireless device processor may determine whether the MCS value is less than or equal to two (2). In response to determining that the MCS value is less than or equal to two (2) (i.e., determination block 430="Yes"), in determination block 432 the wireless device processor may determine whether the identified number of blanked symbols is less than or equal to six (6). In response to determining that the number of blanked symbols identified in block 426 (FIG. 4B) is less than or equal to six (6) (i.e., determination block 432="Yes"), the wireless device processor may return to block 418 (FIG. 4B) to select to transmit the partially blanked subframe. In response to determining the identified number of blanked symbols is greater than six (6) (i.e., determination block 432="No"), the wireless device processor may return to block 422 (FIG. 4B) to select not to transmit the partially blanked subframe.

In response to determining that the MCS value is higher than two (2) (i.e., determination block 430="No"), in determination block 434 the wireless device processor may determine whether the MCS value is less than or equal to ten (10). In response to determining that the MCS value is less than or equal to ten (10) (i.e., determination block 434="Yes"), in determination block 436 the wireless device processor may determine whether the identified number of blanked symbols is less than or equal to four (4). In response to determining that the identified number of blanked symbols is less than or equal to four (4) (i.e., determination block 436="Yes"), the wireless device processor may return to block 418 (FIG. 4B) to select to transmit the partially blanked subframe. In response to determining the identified number of blanked symbols is greater than four (4) (i.e., determination block 436="No"), the wireless device processor may return to block 422 (FIG. 4B) to select not to transmit the partially blanked subframe.

In response to determining that the MCS value is higher than 10 (i.e., determination block 434="No"), in determination block 438 the wireless device processor may determine whether the MCS value is less than or equal to 15. In response to determining that the MCS value is less than or equal to 15 (i.e., determination block 438="Yes"), in determination block 440 the wireless device processor may determine whether the identified number of blanked symbols is less than or equal to two (2). In response to determining that the identified number of blanked symbols is less than or equal to two (2) (i.e., determination block 440="Yes"), the wireless device processor may return to block 418 (FIG. 4B) to select to transmit the partially blanked subframe. In response to determining the identified number of blanked symbols is greater than 2 (i.e., determination block 440="No"), the wireless device processor may return to block 422 (FIG. 4B) to select not to transmit the partially blanked subframe.

In response to determining that the MCS value is greater than 15 (i.e., determination block 438="No"), the wireless device processor may return to block 422 (FIG. 4B) to select not to transmit the partially blanked subframe.

In the various embodiments, the operations in FIGS. 4B and 4C may be repeated for each subframe in which a conflict exists with the communication activity on the second SIM modem stack.

As discussed, the MCS values provided with reference to method 400 (FIGS. 4A-4C) are merely example thresholds that are applicable when the radio access technology associated with the first SIM is LTE. As such, any suitable MCS value(s) and/or blanked symbol thresholds may be selected. In various embodiments, the MCS values may be configurable through firmware associated with the first SIM, and may depend on the particular radio access technology implemented by the first SIM modem stack.

As discussed, the references to first SIM/SIM-1 and second SIM/SIM-2, as well as first and second modem stacks, are arbitrary, and may apply to either or any SIM or associated functions implemented by a processor and/or RF resource(s). Further, such designations of SIMs and/or modem stacks may be switched or reversed between instances of executing the methods herein.

Figure 5:
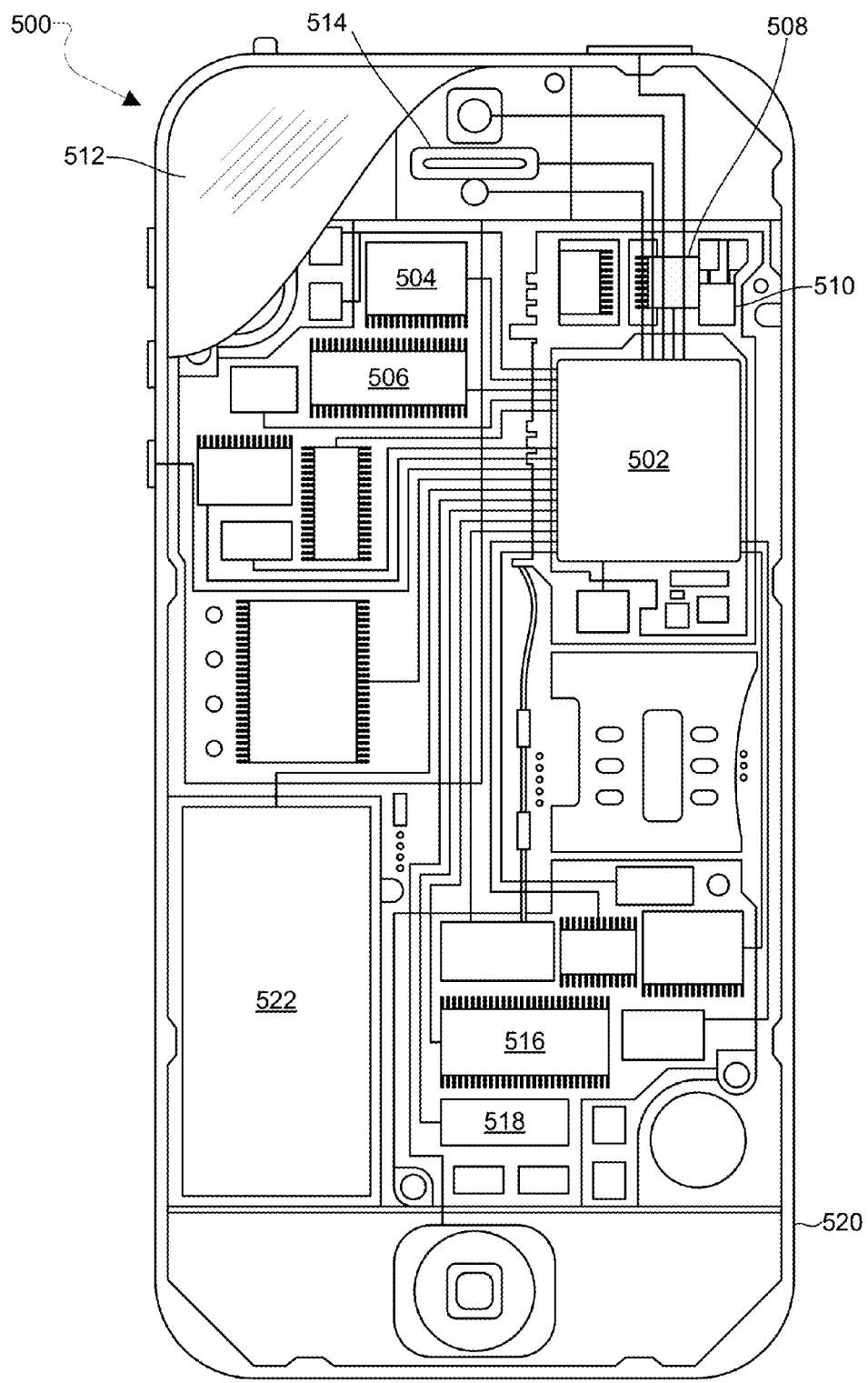
FIG. 5 is a component diagram of an example wireless device suitable for use with various embodiments.

The various embodiments (including, but not limited to, embodiments discussed above with reference to FIGS. 4A-4C) may be implemented in any of a variety of wireless devices, an example 500 of which is illustrated in FIG. 5. For example, the wireless device 500 (which may correspond, for example, the wireless devices 102, 200 in FIGS. 1-2) may include a processor 502 coupled to a touchscreen controller 504 and an internal memory 506. The processor 502 may be one or more multicore integrated circuits (ICs) designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The wireless device 500 may include a cellular network wireless modem chip 516 that enables communication via a cellular network and is coupled to the processor. The wireless device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless device 500 may also include speakers 514 for providing audio outputs. The wireless device 500 may also include a housing 520, constructed of a plastic, metal, or a combination of materials, for containing all or some of the components discussed herein. The wireless device 500 may include a power source 522 coupled to the processor 502, such as a disposable or rechargeable battery. The rechargeable battery may also be coupled to the peripheral device connection port to receive a charging current from a source external to the wireless device 500.

Figure 6:
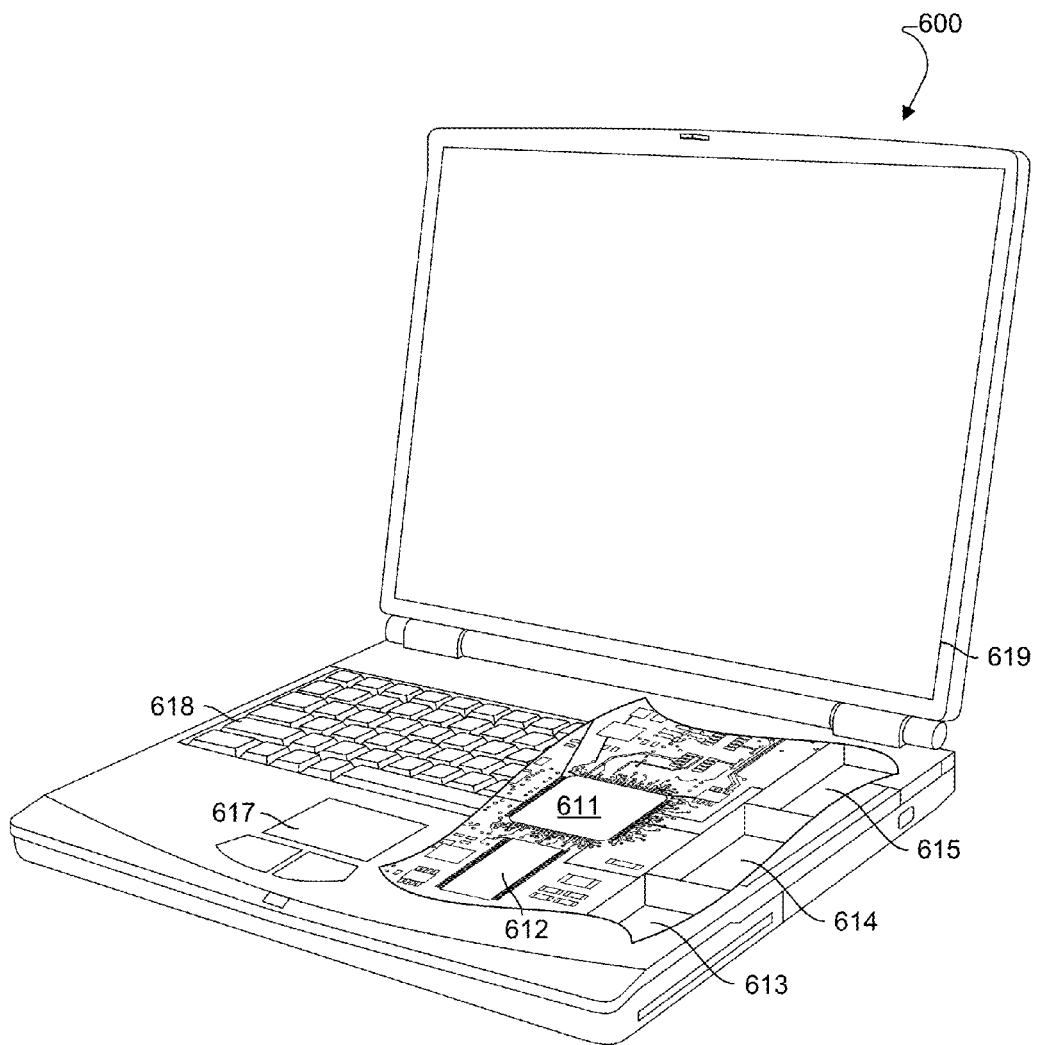
FIG. 6 is a component diagram of another example wireless device suitable for use with various embodiments.

The various embodiments described above (including, but not limited to, embodiments discussed above with reference to FIGS. 4A-4C) may also be implemented within a variety of personal computing devices, such as a laptop computer 600 as illustrated in FIG. 6. Many laptop computers include a touchpad touch surface 617 that serves as the computer's pointing device, and thus may receive drag, scroll, and flick gestures similar to those implemented on wireless computing devices equipped with a touch screen display and described above. The laptop computer 600 will typically include a processor 611 coupled to volatile memory 612 and a large capacity nonvolatile memory, such as a disk drive 613 of Flash memory. The laptop computer 600 may also include a floppy disc drive 614 and a compact disc (CD) drive 615 coupled to the processor 611. The laptop computer 600 may also include a number of connector ports coupled to the processor 611 for establishing data connections or receiving external memory devices, such as a USB or FireWire® connector sockets, or other network connection circuits for coupling the processor 611 to a network. In a notebook configuration, the computer housing includes the touchpad touch surface 617, the keyboard 618, and the display 619 all coupled to the processor 611. Other configurations of the computing device may include a computer mouse or trackball coupled to the processor (e.g., via a USB input) as are well known, which may also be used in conjunction with various embodiments.

The processors 502 and 611 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 506, 612, and 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, nodules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include PAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to other embodiments without departing from the scope of the various embodiments. Thus, the claims are not intended to be limited to the embodiments shown herein but is to be accorded the widest scope consistent with the following claims and the principles and novel features disclosed herein.

What is claimed is:

1. A method of improving performance of a wireless communication device, the method comprising:
   detecting transmit activity on a modem stack associated with a first subscriber identification module (SIM);
   detecting a communication activity scheduled on a modem stack associated with a second SIM that has a higher priority than the transmit activity on the modem stack associated with the first SIM;
   determining whether the transmit activity will conflict with the communication activity; and
   in response to determining that the transmit activity will conflict with the communication activity:
      identifying subframes on the modem stack associated with the first SIM that overlap in time with the communication activity;
      for each identified subframe, blanking symbols that conflict with the communication activity to develop a partially blanked subframe; and
      selecting whether to transmit each partially blanked subframe to a network associated with the first SIM based on a blanking policy.

2. The method of claim 1, wherein implementing the blanking policy further comprises, for each partially blanked subframe:
   determining whether any blanked symbol is carrying a demodulation reference signal (DMRS) in response to determining that each partially blanked subframe is not carrying only control information; and
   preventing transmission of the partially blanked subframe in response to determining that the blanked symbol in the partially blanked subframe is carrying a DMRS.

3. The method of claim 2, wherein implementing the blanking policy further comprises, for each partially blanked subframe:
   determining whether the partially blanked subframe is carrying user data; and
   in response to determining that the partially blanked subframe is carrying user data:
      retrieving a modulation coding scheme (MCS) value associated with the transmit activity on the modem stack associated with the first SIM; and
      identifying an allowed number of blanked symbols corresponding to the MCS value, wherein the allowed number of blanked symbols is a maximum blanking threshold for avoiding transmission failure.

4. The method of claim 3, wherein implementing the blanking policy further comprises, for each partially blanked subframe:
   counting blanked symbols;
   determining whether the count of blanked symbols is less than or equal to the allowed number of blanked symbols; and
   transmitting the partially blanked subframe to the network associated with the first SIM in response to determining that the count of blanked symbols is less than or equal to the allowed number of blanked symbols.

5. The method of claim 4, wherein implementing the blanking policy further comprises, for each partially blanked subframe:
   preventing transmission of the partially blanked subframe in response to determining that the count of blanked symbols is not less than or equal to the allowed number of blanked symbols.

6. The method of claim 5, wherein preventing transmission of the partially blanked subframe comprises triggering a discontinuous transmission (DTX) mode, and invoking signaling that indicates a lack of voice data for transmission in an uplink.

7. The method of claim 1, wherein implementing the blanking policy further comprises for each partially blanked subframe:
   determining whether the partially blanked subframe is carrying user data; and
   in response to determining that the partially blanked subframe is carrying user data:
      retrieving a modulation coding scheme (MCS) value associated with the transmit activity on the modem stack associated with the first SIM; and
      identifying an allowed number of blanked symbols corresponding to the MCS value, wherein the allowed number of blanked symbols is a maximum blanking threshold for avoiding transmission failure.

8. The method of claim 7, wherein implementing the blanking policy further comprises for each partially blanked subframe:
   counting blanked symbols;
   determining whether the count of blanked symbols is less than or equal to the allowed number of blanked symbols; and
   transmitting the partially blanked subframe to the network associated with the first SIM in response to determining that the count of blanked symbols is less than or equal to the allowed number of blanked symbols.

9. The method of claim 8, wherein implementing the blanking policy further comprises for each partially blanked subframe:
preventing transmission of the partially blanked subframe in response to determining that the count of blanked symbols is not less than or equal to the allowed number of blanked symbols.

10. The method of claim 1, wherein the network associated with the first SIM employs a Long Term Evolution (LTE) radio access technology.

11. The method of claim 1, wherein the communication activity scheduled on the modem stack associated with the second SIM comprises a voice or data communication on a network that employs a GSM or UMTS radio access technology.

12. The method of claim 1, wherein the network associated with the first SIM employs a first radio access technology, and a network associated with the second SIM employs a second radio access technology that is different from the first radio access technology.

13. The method of claim 12, wherein the first radio access technology allows for faster data transmissions than the second radio access technology.

14. The method of claim 1, wherein determining whether the transmit activity will conflict with the communication activity comprises:
determining whether the communication activity comprises transmit activity scheduled to be simultaneous with the transmit activity on the modem stack associated with the first SIM; and
determining whether the transmit activity for the first SIM will create radio interference for the communication activity in response to determining that simultaneous transmit activity is scheduled.

15. The method of claim 1, wherein determining whether the transmit activity will conflict with the communication activity comprises:
determining whether the communication activity comprises receive activity scheduled to be simultaneous with the transmit activity on the modem stack associated with the first SIM; and
determining whether the transmit activity for the first SIM will cause desense to the communication activity in response to determining that the receive activity is scheduled to be simultaneous with the transmit activity on the modem stack associated with the first SIM.

16. The method of claim 1, wherein determining whether the transmit activity will conflict with the communication activity comprises:
determining whether the first SIM and the second SIM are associated with a shared RF transmit resource; and
determining whether timing for access to the shared transmit resource scheduled for the communication activity conflicts with allocation of the shared transmit resource to the modem stack associated with the first SIM.

17. A wireless communication device, comprising:
a processor configured with processor-executable instructions to:
detect transmit activity on a modem stack associated with a first subscriber identity module (SIM);
detect a communication activity scheduled on a modem stack associated with a second SIM that has a higher priority than the transmit activity on the modem stack associated with the first SIM;
determine whether the transmit activity will conflict with the communication activity; and
in response to determining that the transmit activity will conflict with the communication activity:
identify subframes on the modem stack associated with the first SIM that overlap in time with the communication activity;
for each identified subframe, blank symbols that conflict with the communication activity to develop a partially blanked subframe; and
select whether to transmit each partially blanked subframe to a network associated with the first SIM based on a blanking policy.

18. The wireless communication device of claim 17, wherein the processor is further configured with processor-executable instructions to implement the blanking policy by:
determining whether any blanked symbol is carrying a demodulation reference signal (DMRS) in response to determining that each partially blanked subframe is not carrying only control information; and
preventing transmission of partially blanked subframes that are determined to be carrying a DMRS.

19. The wireless communication device of claim 18, wherein the processor is further configured with processor-executable instructions to implement the blanking policy by:
determining whether each partially blanked subframe is carrying user data; and
in response to determining that a partially blanked subframe is carrying user data:
retrieving a modulation coding scheme (MCS) value associated with the transmit activity on the modem stack associated with the first SIM; and
identifying an allowed number of blanked symbols corresponding to the MCS value, wherein the allowed number of blanked symbols is a maximum blanking threshold for avoiding transmission failure.

20. The wireless communication device of claim 19, wherein the processor is further configured with processor-executable instructions to implement the blanking policy by:
counting blanked symbols in each partially blanked subframe;
determining whether the count of blanked symbols is less than or equal to the allowed number of blanked symbols; and
transmitting the partially blanked subframes to the network associated with the first SIM determined to have a count of blanked symbols that is less than or equal to the allowed number of blanked symbols.

21. The wireless communication device of claim 20, wherein the processor is further configured with processor-executable instructions to implement the blanking policy by:
preventing transmission of the partially blanked subframes determined to have a count of blanked symbols that is not less than or equal to the allowed number of blanked symbols.

22. The wireless communication device of claim 21, wherein the processor is further configured with processor-executable instructions to prevent transmission of the partially blanked subframe by triggering a discontinuous transmission (DTX) mode, and invoking signaling that indicates a lack of voice data for transmission in an uplink.

23. The wireless communication device of claim 17, wherein the network associated with the first SIM employs a Long Term Evolution (LTE) radio access technology.

24. The wireless communication device of claim 17, wherein the processor is further configured with processor-executable instructions to determine whether the transmit activity will conflict with the communication activity by:

determining whether the communication activity comprises transmit activity scheduled to be simultaneous with the transmit activity on the modem stack associated with the first SIM; and determining whether the transmit activity for the first SIM will create radio interference for the communication activity in response to determining that simultaneous transmit activity is scheduled.

25. The wireless communication device of claim 17, wherein the processor is further configured with processor-executable instructions to determine whether the transmit activity will conflict with the communication activity by:

determining whether the communication activity comprises receive activity scheduled to be simultaneous with the transmit activity on the modem stack associated with the first SIM; and determining whether the transmit activity for the first SIM will cause desense to the communication activity in response to determining that the receive activity is scheduled to be simultaneous with the transmit activity on the modem stack associated with the first SIM.

26. The wireless communication device of claim 17, wherein the processor is further configured with processor-executable instructions to determine whether the transmit activity will conflict with the communication activity by:

determining whether the first SIM and the second SIM are associated with a shared RF transmit resource; and determining whether timing for access to the shared transmit resource scheduled for the communication activity conflicts with allocation of the shared transmit resource to the modem stack associated with the first SIM.

27. A wireless communication device, comprising:

means for detecting transmit activity on a modem stack associated with a first subscriber identity module (SIM);

means for detecting a communication activity scheduled on a modem stack associated with a second SIM that has a higher priority than the transmit activity on the modem stack associated with the first SIM;

means for determining whether the transmit activity will conflict with the communication activity;

means for identifying subframes on the modem stack associated with the first SIM that overlap in time with the communication activity in response to determining that the transmit activity will conflict with the communication activity;

means for blanking symbols that conflict with the communication activity to develop, for each identified subframe, a partially blanked subframe; and means for selecting whether to transmit each partially blanked subframe to a network associated with the first SIM based on a blanking policy.

28. A non-transitory processor-readable storage medium having stored thereon processor-executable instructions configured to cause a processor of a wireless communication device to perform operations comprising:

detecting transmit activity on a modem stack associated with a first subscriber identity module (SIM);

detecting a communication activity scheduled on a modem stack associated with a second SIM that has a higher priority than the transmit activity on the modem stack associated with the first SIM;

determining whether the transmit activity will conflict with the communication activity; and in response to determining that the transmit activity will conflict with the communication activity:

identifying subframes on the modem stack associated with the first SIM that overlap in time with the communication activity;

for each identified subframe, blanking symbols that conflict with the communication activity to develop a partially blanked subframe; and selecting whether to transmit each partially blanked subframe to a network associated with the first SIM based on a blanking policy.

* * * * *